United States Patent Office 3,567,687
Patented Mar. 2, 1971

3,567,687
HIGH MOLECULAR WEIGHT LINEAR POLYESTERS
Hermann Lohwasser, Eduard Radlmann, and Gunther Nischk, Dormagen, Germany, assignors to Farbenfabriken Bayer Aktiengesellschaft, Leverkusen, Germany
No Drawing. Filed Oct. 24, 1968, Ser. No. 770,382
Claims priority, application Germany, Nov. 3, 1967, F 53,949
Int. Cl. C08g 17/08, 17/14
U.S. Cl. 260—49
6 Claims

ABSTRACT OF THE DISCLOSURE

High molecular weight linear polyesters produced by reaction of an organic acid dihalide with a fairly high molecular weight aromatic polyether containing sulfonyl groups and having terminal hydroxy groups.

---

The invention relates to high molecular weight linear polyesters which are soluble in organic solvents and which show an improved resistance both to heat and to hydrolysis, and to a process for their preparation from acid dihalides and mixtures of homologous polymeric aromatic dihydroxy compounds.

Organic and certain inorganic acid dihalides, can be condensed with organic compounds containing at least two phenolic or alcoholic hydroxyl groups, to form products of more or less high molecular weight by known processes, for example in solution, in the melt or by interfacial condensation. In order for example to obtain linear polyesters, it is common practice to use carefully purified dihydroxy compounds and, in particular, aromatic dihydroxy compounds, in cases where the products of condensation have to show a commercially satisfactory resistance to heat and hydrolysis. Despite the large number of known aromatic dihydroxy compounds, resistance to hydrolysis is satisfactory in only a few cases because the number of ester groups in the macromolecule is relatively high, based on the other types of linkage in the polymer chain. For the same reason, there have until now been very few alternative methods of synthesising polyesters.

It is an object of this invention to provide high molecular weight linear polyesters that do not have the disadvantages mentioned above.

This object is accomplished by high molecular weigh linear polyesters having recurring structural units of the formula

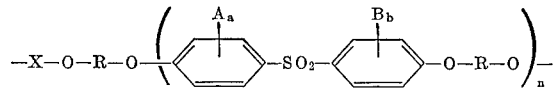

wherein X represents a bivalent acid radical selected from the group consisting of —CO—R—CO— and

—SO$_2$—R—SO$_2$—

R represents a bivalent aromatic radical which may be substituted or not selected from the group consisting of phenylene, naphthylene or diphenylene or a radical of the general formula

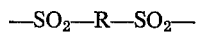

wherein Z represents sulphoxide, sulphonyl, carbonyl, oxygen, alkylene, cycloalkylene, alkylene phenylene or alkylene naphthylene; A and B each represents a halogen atom or an alkyl or alkoxy group; $a$ and $b$ each represents 0 or an integer from 1 to 4 and $n$ represents an integer from 3 to 20; said high molecular weight polyesters having a relative solution viscosity $\eta_{rel}$ (as measured in a 0.5% by weight solution in methylene chloride at 20° C. in an Ubbelohde viscosimeter) of from 1.5 to 2.5 and a melting range above 250° C.

It is another object of this invention to provide a process for the production of high molecular weight linear polyesters soluble in organic solvents which comprises reacting an organic acid dihalide with a fairly high molecular weight aromatic dihydroxy compound of the general formula

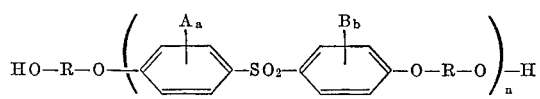

wherein R represents a bivalent aromatic radical which may be substituted or not, selected from the group consisting of phenylene, naphthylene or diphenylene or a radical of the general formula

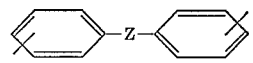

wherein Z represents sulphoxide, sulphonyl, carbonyl, oxygen, alkylene, cycloalkylene, alkylene phenylene or alkylene naphthylene; A and B each represents halogen, alkyl, alkoxy; $a$ and $b$ each represents 0 or an integer from 1 to 4 and $n$ represents an integer from 3 to 20; said reacting being carried out at a temperature in the range from +10 to +40° C. in a polar organic solvent in the presence of an acid binding agent.

It is also possible to use a mixture of said fairly high molecular weight dihydroxy compounds and low molecular weight aromatic dihydroxy compounds for the reaction with the organic acid dihalide.

Use of the particular dihydroxy compounds of the formula given above, provides the high molecular weight condensation products with substantially the properties of the recurring, already fairly high molecular weight units, whilst the characteristic properties of ester groups are not manifested since these groups are present in small numbers only. It is thus possible, by using fairly high molecular weight polyether sulphone dihydroxy compounds to obtain high molecular weight products of improved resistance both to heat and to hydrolysis, coupled with high solubility in organic solvents, an equally high affinity for dyes and outstanding mechanical and electrical insulating properties.

To prepare the mixtures of homologous polymeric aromatic dihydroxy compounds corresponding to the general formula

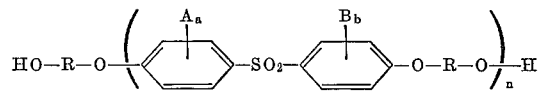

wherein A, B, $a$, $b$, R and $n$ have the meaning as given above, 4,4′-dichlorodiphenylsulphone or its alkyl, alkoxy or halogen substitution products may be reacted with low molecular weight aromatic dihydroxy compounds in strongly polar organic solvents, such as sulphoxides or sulphones, in the presence of alkalis at temperatures above 70° C. The average molecular weight obtained or the degree of condensation $n$ of the polymer-homologous mixture may be controlled by varying the molar ratio of dihydroxy compound to 4,4′-dichlorodiphenylsulphone or its substitution products (it is always greater than 1), and is checked by determining the number of terminal OH-groups. Examples of suitable starting compounds include resorcinol; hydroquinone; 2,6-dihydroxynaphthalene; 4,4′-dihydroxydiphenyl; 4,4′-dihydroxydiphenyl ether; 4,4′-dihydroxydiphenyl sulphide; 4,4′-dihydroxydiphenyl sulphone; 4,4′-dihydroxydiphenyl-2,2-propane;

4,4'-dihydroxydiphenyl-1,1-cyclohexane and their alkyl, alkoxy and halogen substitution products.

Organic acid halides suitable for preparing the polyesters according to the invention include aromatic dicarboxylic acid dihalides of the general formula Hal—CO—R—CO—Hal wherein R represents an optionally substituted aromatic radical, such as phenylene, naphthylene or diphenylene or a radical of the general formula

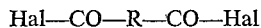

wherein Z represents sulphoxide, sulphonyl, carbonyl, oxygen, alkylene, cycloalkylene, alkylene phenylene or alkylene naphthylene; and Hal is preferably chlorine, for example diphenyl ether-4,4'-dicarboxylic acid dichloride; diphenyl sulphone-4,4'-dicarboxylic acid dichloride; diphenyl-4,4'-dicarboxylic acid dichloride; naphthalene-1,5-dicarboxylic acid dichloride; and, in particular, isophthalic acid dichloride and terephthalic acid dichloride; oxalyl chloride; aromatic disulphonic acid dihalides of the formula Hal—$SO_2$—R—$SO_2$—Hal, wherein R is as defined above and Hal is preferably chlorine, for example diphenyl-4,4'-disulpho chloride; diphenyl ether-4,4'-disulpho chloride; diphenyl sulphone-3,3'-disulpho chloride, naphthalene-2,7-disulpho chloride; and in particular benzene-1,3-disulpho chloride, toluene-2,4-disulpho chloride and m-xylene-4,6-disulpho chloride.

Polycondensation of the dihydroxy compounds with the acid dihalides may be carried out in solution in polar organic solvents and, preferably, by the interfacial process in the presence of acid-binding agents. Suitable polar organic solvents include halogenated hydrocarbons such as chloroform, methylene chloride, ethylene chloride, bromobenzene and 1,2-dichlorobenzene; cyclic ethers such as tetrahydrofuran and dioxan; cyclic ketones such as cyclopentanone and cyclohexanone; and aromatic tertiary bases such as pyridine and quinoline.

Tertiary aliphatic and aromatic amines, quaternary ammonium hydroxides, alkali metal and alkaline earth metal hydroxides, oxides and carbonates, may be used as the acid binding agents, although it is preferred to use water-soluble bases, for example pyridine, trimethylbenzylammonium hydroxide, sodium hydroxide or potassium carbonate, all of which enable the interfacial condensation process to be used on a wide scale. As a rule, the reaction is completed smoothly and quickly at temperatures as low as room temperature by one of the solution processes in the complete absence of catalysts, so that high molecular weight products are particularly easy to obtain.

The process according to the invention can be carried out for example by dissolving the fairly high molecular weight aromatic dihydroxy compound in a suitable solvent, preferably methylene chloride, preparing the corresponding bisphenolate in finely divided form by adding an equivalent quantity of an aqueous solution of a base, preferably sodium hydroxide, and then quickly running in, for example over a period of from 5 to 30 minutes, with thorough stirring, a solution of an equivalent quantity of an acid dihalide in an inert solvent, preferably methylene chloride, at a temperature of from +10 to +40° C. and preferably at room temperature. The increase in viscosity which accompanies polycondensation is usually noticeable after a few minutes.

As a rule, the starting compounds are used in equimolar quantities in the process according to the invention. With sensitive acid dihalides, it is advisable to use an excess of from 3 to 12% of the halide, and a correspondingly increased quantity of the base. Particular embodiments of the process according to the invention comprise using acid dihalide mixtures and, in particular, mixtures of the aforementioned mixtures of homologous polymeric dihydroxy compounds and ordinary aromatic dihydroxy compounds, for example hydroquinone; 4,4'-dihydroxydiphenyl; 4,4'-dihydroxydiphenyl ether; 4,4'-dihydroxydiphenyl sulphone; and 3,5,3',5'-tetrachloro-4,4'-dihydroxydiphenyl-2,2-propane (tetrachloro-bisphenol A). It is of course also possible with advantage to use suitable combinations of solvents or mixtures of bases.

The highly viscous polyester solutions containing from 5 to 50% by weight of polyester are worked up by repeated stirring with water, after which the polyesters are precipitated with a non-solvent diluent chosen from the group of hydrocarbons, alcohols and lower ketones, preferably with acetone. The polyesters may be precipitated just as effectively, for example, by introducing the reaction mixture into boiling water. After they have been size-reduced, washed and dried, the colourless precipitation products may be stored for unlimited periods. They have relative solution viscosities $\eta_{rel}$ of from 1.5 to 2.5, as measured on a 0.5% by weight methylene chloride solution at 20° C. in an Ubbelohde viscosimeter.

Whereas in the case of the known high molecular weight polyether sulphones, prepared for example by polycondensation of 4,4'-dichlorodiphenyl sulphone with 4,4'-dihydroxydiphenyl-2,2-propane in a molar ratio of 1:1, it is difficult to obtain a molecular weight distribution that is favourable both for processing and for the mechanical properties of products moulded from them, the polyesters according to the invention based on homologous polymeric dihydroxy polyether sulphones provide access to a large group of commercially valuable polymers. Following dissolution in organic solvents such as methylene chloride, chlorobenzene, dioxan, dimethyl formamide, the novel products may be converted into filaments and films or into moulded articles, optionally from the melt. In addition to their outstanding mechanical properties, they show an improved stability, in comparison with polyesters based on low molecular weight defined dihydroxy compounds, against degradation through hydrolysis, oxidation or the action of heat.

In the following examples, parts by volume are as to parts by weight as litres to kilograms. The relative viscosities $\eta_{rel}$ were measured on 0.5% by weight solutions in methylene chloride at 20° C. in an Ubbelohde viscosimeter.

The following examples are to further illustrate the invention without limiting it.

EXAMPLE 1

Polyisophthalate based on the dihydroxy compound

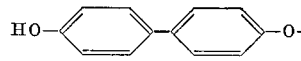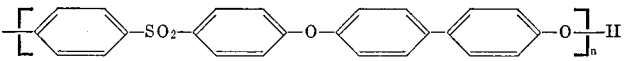

molecular weight 4960 ($n \cong 12$).

100 parts by weight of dihydroxy compound of molecular weight 4960 are dissolved in 500 parts by volume of dioxan. The resulting solution is combined with a solution of 2 parts by weight of sodium hydroxide in 60 parts by volume of water, and 4.47 parts by weight of isophthalyl chloride in 60 parts by volume of methylene chloride are added over a period of 5 minutes. The reaction mixture is stirred for an hour, and the polyester lumps that are formed are washed three times with water and stirred with 700 parts by volume of acetone. A coarsely divided product is obtained, and is mechanically size-reduced, purified by repeated washing with acetone and water and then dried.

Melting range 265–283° C., relative viscosity $\eta_{rel}=1.63$.

Preparation of the homologous polymeric dihydroxypolyethersulphone

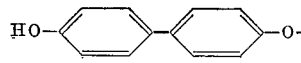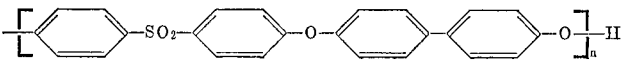

from 4,4'-dihydroxydiphenyl and 4,4'-dichlorodiphenyl-sulphone, molecular weight 4960 ($n \cong 12$).

400 parts by weight of 4,4-dihydroxydiphenyl and 172 parts by weight of sodium hydroxide are heated in 5000 parts by volume of dimethyl sulphoxide until a clear solution is obtained. By concentrating the solution to around 1500 parts by volume at reduced pressure, some of the bisphenolate is precipitated in finely divided form. 569 parts by weight of 4,4'-dichlorodiphenyl sulphone are then added, followed by heating for 7 hours with stirring at 120° C. in a stream of nitrogen. After cooling, the reaction product is diluted with 16,000 parts by volume of water, neutralised with dilute hydrochloric acid and heated with steam. The resulting precipitate is suction-filtered while it is still hot, washed with water and dried. The colourless product is soluble in dioxan and cyclohexanone. Yield 800 parts by weight, melting range 205–218° C., average molecular weight by titration: 4960.

EXAMPLE 2

Polybenzene disulphonate based on the dihydroxy compound

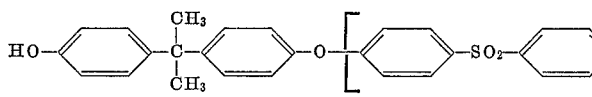

molecular weight 2010 ($n \cong 4$).

A solution of 22.4 parts by weight of calcium hydroxide in 250 parts by volume of water is added to a solution of 400 parts by weight of dihydroxy compound of molecular weight 2010 in 2000 parts by volume of methylene chloride. A solution of 55 parts by weight of benzene-1,3-disulpho chloride in 250 parts by volume of methylene chloride is then added dropwise with stirring over a period of 15 minutes, stirring being continued at room temperature. The highly viscous mass formed is initially stirred repeatedly with water and then mixed with 600 parts by volume of acetone. The colourless polysulphonate that is precipitated is first size-reduced and then washed with acetone and water and dried. Melting range 270–290° C., relative viscosity $\eta_{rel}=1.92$.

Preparation of the homologous polymeric dihydroxy-polyether sulphone

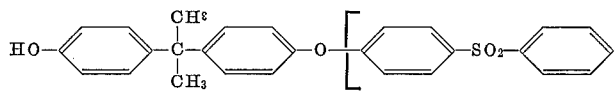

from 4,4'-dihydroxydiphenyl-2,2-propane and 4,4'-dichlorodiphenyl sulphone, molecular weight 2010 ($n \cong 4$).

700 parts by weight of 4,4'-dihydroxydiphenyl-2,2-propane and 343 parts by weight of potassium hydroxide are dissolved under heat in 7000 parts by volume of dimethyl sulphoxide, forming a clear solution. The solution is concentrated to about 5000 parts by volume by distillation at reduced pressure, and heated in a stream of nitrogen to 120° C., and 704 parts by weight of 4,4-dichlorodiphenyl sulphone are added in portions. After stirring for 5 hours at 120° C., the reaction mixture is cooled, poured into 20,000 parts by volume of water and neutralised with dilute hydrochloric acid. A voluminous precipitate is obtained, being converted into a readily filtered form by the prolonged introduction of steam. The precipitate is suction-filtered, washed repeatedly with water and dried. The colourless product is soluble in methylene chloride. Yield: 1200 parts by weight. Melting range 160–166° C., average molecular weight by titration 2010.

EXAMPLE 3

Polysulphonate based on the dihydroxy compound

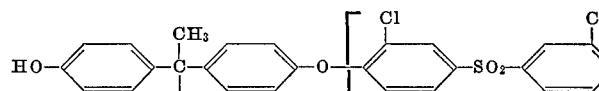

molecular weight 1860 ($n \cong 3$).

25 parts by weight of dihydroxy compound of average molecular weight 1860 are dissolved in 200 ml. of chloroform, the resulting solution is combined with a solution of 6.9 g. of diphenyl ether-4,4'-disulphochloride in 20 ml. of chloroform, followed by the addition of a solution of 2.2 g. of sodium hydroxide in 20 ml. of water. After stirring for 30 minutes at room temperature, the reaction mixture is neutralized with dilute hydrochloric acid, washed with water and diluted with methanol. The precipitated polysulphonate is washed with methanol and dried at 120° C.

Melting range 268–280° C., relative viscosity $\eta_{rel}=1.77$.

Preparation of the dihydroxy compound of molecular weight 1860:

The combined solutions of 1000 parts by weight of 4,4'-dihydroxydiphenyl-2,2-propane in 7000 parts by volume of dimethyl sulphoxide and 490 parts by weight of potassium hydroxide in 500 parts by volume of water, are concentrated at reduced pressure by 1500 parts by volume of solvent and 1170 parts by weight of 3,3',4,4'-tetrachlorodiphenyl sulphone are added to them in portions

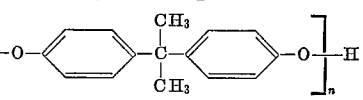

at such a rate that the temperature does not exceed 130° C. On completion of the addition, stirring is continued for another 4 hours at 110° C. in a nitrogen atmosphere. The product of condensation is stirred into 25,000 parts by volume of water, precipitated by neutralisation with dilute hydrochloric acid, suction-filtered, washed with water and dried at 70° C./14 torr. Yield: 1900 parts by weight. Melting range: 183–190° C. Average molecular weight by titration: 1860.

What we claim is:

1. High molecular weight linear polyester consisting essentially of recurring structural units of the formula

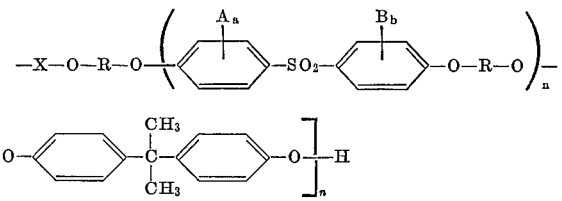

wherein

X represents a bivalent acid radical selected from the group consisting of

—CO—R—CO— and —SO$_2$—R—SO$_2$—

R represents a bivalent aromatic radical optionally substituted with alkyl, alkoxy or halogen selected from the group consisting of phenylene, naphthalene, diphenylene or a radical of the general formula

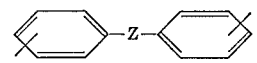

wherein Z represents sulphonyl or oxygen,

A and B each represent a chlorine atom, $a$ and $b$ each represents 0 or an integer from 1 to 4, and $n$ represents an integer from 3 to 20, said high molecular weight polyesters having a relative solution viscosity $\eta_{rel}$ (as measured in a 0.5% by weight solution in methylene chloride at 20° C. in an Ubbelohde viscosimeter) of from 1.5 to 2.5 and a melting range above 250° C.

2. High molecular weight linear polyester consisting essentially of recurring structural units of the formula

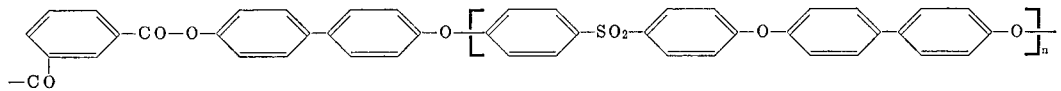

wherein $n$ is about 12.

3. High molecular weight linear polyester consisting essentially of recurring structural units of the formula

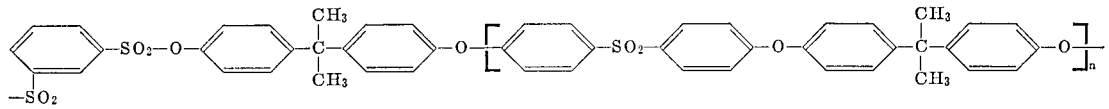

wherein $n$ is about 4.

4. High molecular weight linear polyester consisting essentially of recurring structural units of the formula

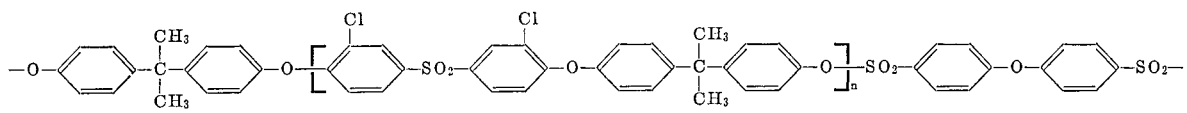

wherein $n$ is about 3.

5. High molecular weight linear polyesters as defined in claim 1 wherein X represents the dechlorinated moiety of diphenyl ether-4,4'-dicarboxylic acid dichloride; diphenyl sulphone-4,4'-dicarboxylic acid dichloride; diphenyl-4,4'-dicarboxylic acid dichloride; naphthalene-1,5-dicarboxylic acid dichloride; isophthalic acid dichloride; terephthalic acid dichloride; diphenyl-4,4'-disulpho chloride; diphenyl ether - 4,4' - disulpho chloride; diphenyl sulphone-3,3'-disulpho chloride; naphthalene-2,7-disulpho chloride; benzene-1,3-disulpho chloride; toluene-2,4-disulpho chloride; and m-xylene-4,6-disulpho chloride.

6. High molecular weight linear polyesters as defined in claim 1 wherein R represents the dehydroxylated moiety of resorcinol; hydroquinone; 2,6 - dihydroxynaphthalene; 4,4'-dihydroxydiphenyl; 4,4'-dihydroxydiphenyl ether; 4,4'-dihydroxydiphenyl sulphide; 4,4'-dihydroxydiphenyl sulphone; 4,4'-dihydroxydiphenyl-2,2-propane; 4,4'-dihydroxydiphenyl-1,1-cyclohexane; and alkyl, alkoxy and halogen substitution products thereof.

References Cited
UNITED STATES PATENTS

| | | | |
|---|---|---|---|
| 3,234,167 | 2/1966 | Sweeny | 260—30.4 |
| 3,351,611 | 11/1967 | Conix | 260—47 |
| 3,351,624 | 11/1967 | Conix | 260—47 |
| 3,401,148 | 9/1968 | Schlott et al. | 260—49 |

WILLIAM H. SHORT, Primary Examiner

L. L. LEE, Assistant Examiner

U.S. Cl. X.R.

260—30.4, 32.6, 32.8, 33.8, 47, 860